(12) United States Patent
Kamble et al.

(10) Patent No.: US 10,354,070 B2
(45) Date of Patent: Jul. 16, 2019

(54) THREAD LEVEL ACCESS CONTROL TO SOCKET DESCRIPTORS AND END-TO-END THREAD LEVEL POLICIES FOR THREAD PROTECTION

(71) Applicant: Avocado Systems Inc., San Jose, CA (US)

(72) Inventors: Keshav Govind Kamble, San Jose, CA (US); Amitabh Sinha, Fremont, CA (US); Shailesh R. Naik, Saratoga, CA (US)

(73) Assignee: AVOCADO SYSTEMS INC., San Jose, CA (US)

( * ) Notice: Subject to any disclaimer, the term of this patent is extended or adjusted under 35 U.S.C. 154(b) by 318 days.

(21) Appl. No.: 15/243,854

(22) Filed: Aug. 22, 2016

(65) Prior Publication Data
US 2017/0053120 A1 Feb. 23, 2017

Related U.S. Application Data

(60) Provisional application No. 62/208,605, filed on Aug. 22, 2015.

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01)

(58) Field of Classification Search
CPC .................................................. G06F 21/566
See application file for complete search history.

(56) References Cited

U.S. PATENT DOCUMENTS

| | | | |
|---|---|---|---|
| 6,694,434 B1 * | 2/2004 | McGee | G06F 21/565 713/182 |
| 7,530,072 B1 * | 5/2009 | Cheaz | G06F 9/5027 718/104 |
| 7,788,480 B2 | 8/2010 | Winget et al. | |
| 7,895,642 B1 | 2/2011 | Larson et al. | |
| 8,776,168 B1 | 7/2014 | Gibson et al. | |
| 9,077,617 B1 | 7/2015 | Seth et al. | |
| 9,094,407 B1 | 7/2015 | Matthieu et al. | |

(Continued)

OTHER PUBLICATIONS

Supplemental Notice of Allowance from U.S. Appl. No. 15/181,275, dated Sep. 6, 2018.

(Continued)

*Primary Examiner* — William S Powers
(74) *Attorney, Agent, or Firm* — Zilka-Kotab, P.C.

(57) ABSTRACT

In one embodiment, a system includes a processing circuit and logic integrated with and/or executable by the processing circuit. The logic causes the processing circuit to monitor a plurality of application instances operating on a first host. The logic also causes the processing circuit to detect that a first application thread has been called by a first application instance operating on the first host and determine whether the first application thread is registered to be called by the first application instance on the first host by consulting a registration index. Moreover, the logic causes the processing circuit to quarantine the first application thread in response to a determination that the first application thread is not registered to be called by the first application instance on the first host.

17 Claims, 11 Drawing Sheets

(56) References Cited

U.S. PATENT DOCUMENTS

| | | | |
|---|---|---|---|
| 9,338,181 | B1 | 5/2016 | Burns et al. |
| 9,349,015 | B1 | 5/2016 | Archer et al. |
| 9,491,107 | B1 | 11/2016 | Scudder et al. |
| 9,652,618 | B1 | 5/2017 | Lemer |
| 9,742,768 | B2 | 8/2017 | Cholas et al. |
| 9,952,790 | B2 | 4/2018 | Kamble |
| 9,954,578 | B2 | 4/2018 | Ehrensvard |
| 10,049,211 | B1 * | 8/2018 | Lukacs ............... G06F 21/566 |
| 10,129,220 | B2 | 11/2018 | Kamble |
| 10,148,697 | B2 | 12/2018 | Kamble |
| 10,193,889 | B2 | 1/2019 | Kamble |
| 10,193,930 | B2 | 1/2019 | Kamble |
| 2003/0118185 | A1 | 6/2003 | Lambert |
| 2003/0140089 | A1 | 7/2003 | Hines et al. |
| 2004/0034767 | A1 | 2/2004 | Robinson et al. |
| 2006/0020814 | A1 | 1/2006 | Lieblich et al. |
| 2006/0069912 | A1 | 3/2006 | Zheng et al. |
| 2007/0028090 | A1 | 2/2007 | Lopez et al. |
| 2007/0033642 | A1 | 2/2007 | Ganesan et al. |
| 2007/0129015 | A1 | 6/2007 | Iwamoto et al. |
| 2007/0239761 | A1 | 10/2007 | Baio et al. |
| 2007/0250923 | A1 | 10/2007 | M'Raihi |
| 2008/0115203 | A1 | 5/2008 | Elzur |
| 2008/0201772 | A1 | 8/2008 | Mondaeev et al. |
| 2009/0019535 | A1 | 1/2009 | Mishra et al. |
| 2009/0172402 | A1 | 7/2009 | Tran |
| 2009/0185687 | A1 | 7/2009 | Wankmueller et al. |
| 2009/0228970 | A1 | 9/2009 | Morimoto |
| 2009/0328194 | A1 | 12/2009 | Kim et al. |
| 2010/0037295 | A1 | 2/2010 | Oh et al. |
| 2010/0228964 | A1 | 9/2010 | Booth |
| 2010/0275026 | A1 | 10/2010 | McLean |
| 2011/0173699 | A1 | 7/2011 | Figlin et al. |
| 2011/0214157 | A1 | 9/2011 | Korsunsky et al. |
| 2011/0302624 | A1 | 12/2011 | Chen et al. |
| 2011/0321172 | A1 | 12/2011 | Maeda et al. |
| 2012/0051314 | A1 | 3/2012 | Goyal et al. |
| 2012/0096510 | A1 | 4/2012 | Bentall |
| 2012/0173875 | A1 | 7/2012 | Mahidhara et al. |
| 2012/0216244 | A1 | 8/2012 | Kumar et al. |
| 2012/0311614 | A1 | 12/2012 | DeAnna et al. |
| 2013/0179061 | A1 | 7/2013 | Gadh et al. |
| 2013/0191905 | A1 | 7/2013 | Harada et al. |
| 2014/0036662 | A1 | 2/2014 | Takeshima et al. |
| 2014/0051432 | A1 | 2/2014 | Gupta et al. |
| 2014/0237545 | A1 | 8/2014 | Mylavarapu et al. |
| 2014/0317738 | A1 | 10/2014 | Be'ery et al. |
| 2014/0380484 | A1 | 12/2014 | Choi et al. |
| 2015/0134965 | A1 | 5/2015 | Morenius et al. |
| 2015/0172153 | A1 | 6/2015 | Sharma et al. |
| 2015/0213237 | A1 | 7/2015 | Kruglick |
| 2016/0080399 | A1 | 3/2016 | Harris et al. |
| 2016/0191530 | A1 | 6/2016 | Jain et al. |
| 2016/0308904 | A1 | 10/2016 | Yoon et al. |
| 2016/0321452 | A1 | 11/2016 | Richardson et al. |
| 2016/0364163 | A1 | 12/2016 | Kamble |
| 2016/0366108 | A1 | 12/2016 | Kamble |
| 2016/0366142 | A1 | 12/2016 | Kamble |
| 2016/0366186 | A1 | 12/2016 | Kamble |
| 2016/0366187 | A1 | 12/2016 | Kamble |
| 2016/0373485 | A1 | 12/2016 | Kamble |
| 2016/0381076 | A1 | 12/2016 | Kamble et al. |
| 2017/0006065 | A1 | 1/2017 | Kamble et al. |
| 2017/0019388 | A1 | 1/2017 | Kamble et al. |
| 2017/0039371 | A1 * | 2/2017 | Lukacs ............... G06F 21/53 |
| 2017/0063904 | A1 | 3/2017 | Muddu et al. |
| 2017/0230414 | A1 | 8/2017 | Kamble |
| 2018/0069862 | A1 | 3/2018 | Cholas et al. |
| 2018/0089429 | A1 | 3/2018 | Kamble |

OTHER PUBLICATIONS

Notice of Allowance from U.S. Appl. No. 15/184,956, dated Sep. 4, 2018.
Non-Final Office Action from U.S. Appl. No. 15/424,749, dated Sep. 19, 2018.
Kar et al., "Prevention of SQL Injection Attack Using Query Transformation and Hashing," 3rd Annual IEEE International Advance Computing Conference, 2013, pp. 1317-1323.
Kamble, K., U.S. Appl. No. 15/181,275, filed Jun. 13, 2016.
Non-Final Office Action from U.S. Appl. No. 15/181,275, dated Dec. 8, 2017.
Younis, A., "Socket Data structures and How the TCP protocol works," CS457, Fall 2014, pp. 1-18 retrieved from hittp://www.cs.colostate.edu/-gersch/cs457/CS457 tutorial2.pdf.
Hall, B., "Beej's Guide to Network Programming Using Internet Sockets," May 3, 2001, pp. 1-47 retrieved from http://www.cs.columbia.edu/-danr/courses/6761 /Fall00/hw/pa1 /6761-sockhelp.pdf.
Kamble, K., U.S. Appl. No. 15/181,304, filed Jun. 13, 2016.
Notice of Allowance from U.S. Appl. No. 15/181,304, dated Dec. 15, 2017.
Kamble, K., U.S. Appl. No. 15/182,505, filed Jun. 14, 2016.
Non-Final Office Action from U.S. Appl. No. 15/182,505, dated Apr. 6, 2018.
Kamble, K., U.S. Appl. No. 15/182,544, filed Jun. 14, 2016.
Non-Final Office Action from U.S. Appl. No. 15/182,544, dated Mar. 16, 2018.
Kamble, K., U.S. Appl. No. 15/182,548, filed Jun. 14, 2016.
Non-Final Office Action from U.S. Appl. No. 15/182,548, dated Jun. 15, 2018.
Kamble, K., U.S. Appl. No. 15/184,956, filed Jun. 16, 2016.
Non-Final Office Action from U.S. Appl. No. 15/184,956, dated Mar. 30, 2018.
Kamble et al., U.S. Appl. No. 15/191,420, filed Jun. 23, 2016.
Non-Final Office Action from U.S. Appl. No. 15/191,420, dated Mar. 22, 2018.
Kamble et al., U.S. Appl. No. 15/197,635, filed Jun. 29, 2016.
Non-Final Office Action from U.S. Appl. No. 15/197,635, dated May 11, 2018.
Kamble et al., U.S. Appl. No. 15/210,828, filed Jul. 14, 2016.
Non-Final Office Action from U.S. Appl. No. 15/210,828, dated Jun. 13, 2018.
Kamble, K., U.S. Appl. No. 15/275,239, filed Sep. 23, 2016.
Non-Final Office Action from U.S. Appl. No. 15/275,239, dated May 16, 2018.
Kamble, K., U.S. Appl. No. 15/424,749, filed Feb. 3, 2017.
Final Office Action from U.S. Appl. No. 15/191,420, dated Aug. 14, 2018.
Notice of Allowance from U.S. Appl. No. 15/181,275, dated Jul. 16, 2018.
Du, W., "SYN-Cookies Exploration Lab," Syracuse University, 2006, pp. 1-3.
Notice of Allowance from U.S. Appl. No. 15/182,544, dated Oct. 4, 2018.
Supplemental Notice of Allowance from U.S. Appl. No. 15/181,275, dated Oct. 17, 2018.
Corrected Notice of Allowance from U.S. Appl. No. 15/184,956, dated Oct. 29, 2018.
Notice of Allowance from U.S. Appl. No. 15/197,635, dated Nov. 14, 2018.
Notice of Allowance from U.S. Appl. No. 15/182,505, dated Dec. 3, 2018.
Corrected Notice of Allowance from U.S. Appl. No. 15/197,635, dated Dec. 10, 2018.
Final Office Action from U.S. Appl. No. 15/182,548, dated Jan. 15, 2019.
Final Office Action from U.S. Appl. No. 15/275,239, dated Jan. 18, 2019.

* cited by examiner

THREAD LEVEL ACCESS CONTROL TO SOCKET DESCRIPTORS AND END-TO-END THREAD LEVEL POLICIES FOR THREAD PROTECTION

FIELD OF THE INVENTION

The present invention relates to network and system protection, and more particularly, this invention relates to thread level access control to socket descriptors for thread protection.

BACKGROUND

Scaled-out, distributed applications are made up of a large number of application instances. These application instances have their own data in cache and memory of a processor on which these applications run. A large number of such application instances communicate with each other and process data in parallel to create an aggregate output. Communication mechanisms, such as data sockets, are used by the applications to exchange messages and data with other applications. Enterprise-level applications generate huge amounts of communication traffic from internet-based clients as well as within the applications in a data center.

These types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

Typically, application security in data centers is attempted by applying policies and rules at various levels using security appliances installed in the data center. However, in spite of providing layers of security appliances to create a security perimeter around the data center, malware and malicious software still enters inside the servers in the data center to steal data and attack applications.

In most cases of data breaches, data and application instances that utilize flows in the East-West (E-W) direction, i.e., communication between servers and application instances inside of the data center, are attacked. This is different from North-South (N-S) flows which are protected by conventional data security appliances. Since the edge of the data center where all the servers are connected is considered the safest place, many times, applications communicate with each other in clear data without protecting the data. A huge amount of data is shared across applications and application tiers in the E-W direction within the data center.

Some types of malware have capabilities to inject applets into underlying application code which is then configured to interact with local and remote applications through standard communication channels, such as data sockets, to attack applications and their data. One current attempted solution to overcome these attacks is to use behavior-based analysis to understand exceptions in application behavior to protect applications from such attacks. However, this method has multiple deficiencies since application behavior is highly dynamic, behavior analysis is not performed in real time nor deterministic, and behavior analysis generates a large number of false positives, which reduces the performance of applications in a data center.

SUMMARY

In one embodiment, a system includes a processing circuit and logic integrated with and/or executable by the processing circuit. The logic causes the processing circuit to monitor a plurality of application instances operating on a first host. The logic also causes the processing circuit to detect that a first application thread has been called by a first application instance operating on the first host and determine whether the first application thread is registered to be called by the first application instance on the first host by consulting a registration index. Moreover, the logic causes the processing circuit to quarantine the first application thread in response to a determination that the first application thread is not registered to be called by the first application instance on the first host.

According to another embodiment, a method includes monitoring a plurality of application instances operating on a first host, detecting that a first application thread has been called by a first application instance operating on the first host, determining whether the first application thread is registered to be called by the first application instance on the first host by consulting a registration index, and quarantining the first application thread in response to a determination that the first application thread is not registered to be called by the first application instance on the first host.

In yet another embodiment, a computer program product includes a computer readable storage medium having program instructions stored thereon. The program instructions are executable by a processing circuit to cause the processing circuit to monitor a plurality of application instances operating on a first host and detect that a first application thread has been called by a first application instance operating on the first host. The program instructions also cause the processing circuit to determine whether the first application thread is registered to be called by the first application instance on the first host by consulting a registration index, and quarantine the first application thread in response to a determination that the first application thread is not registered to be called by the first application instance on the first host.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

DETAILED DESCRIPTION

Figure 1:
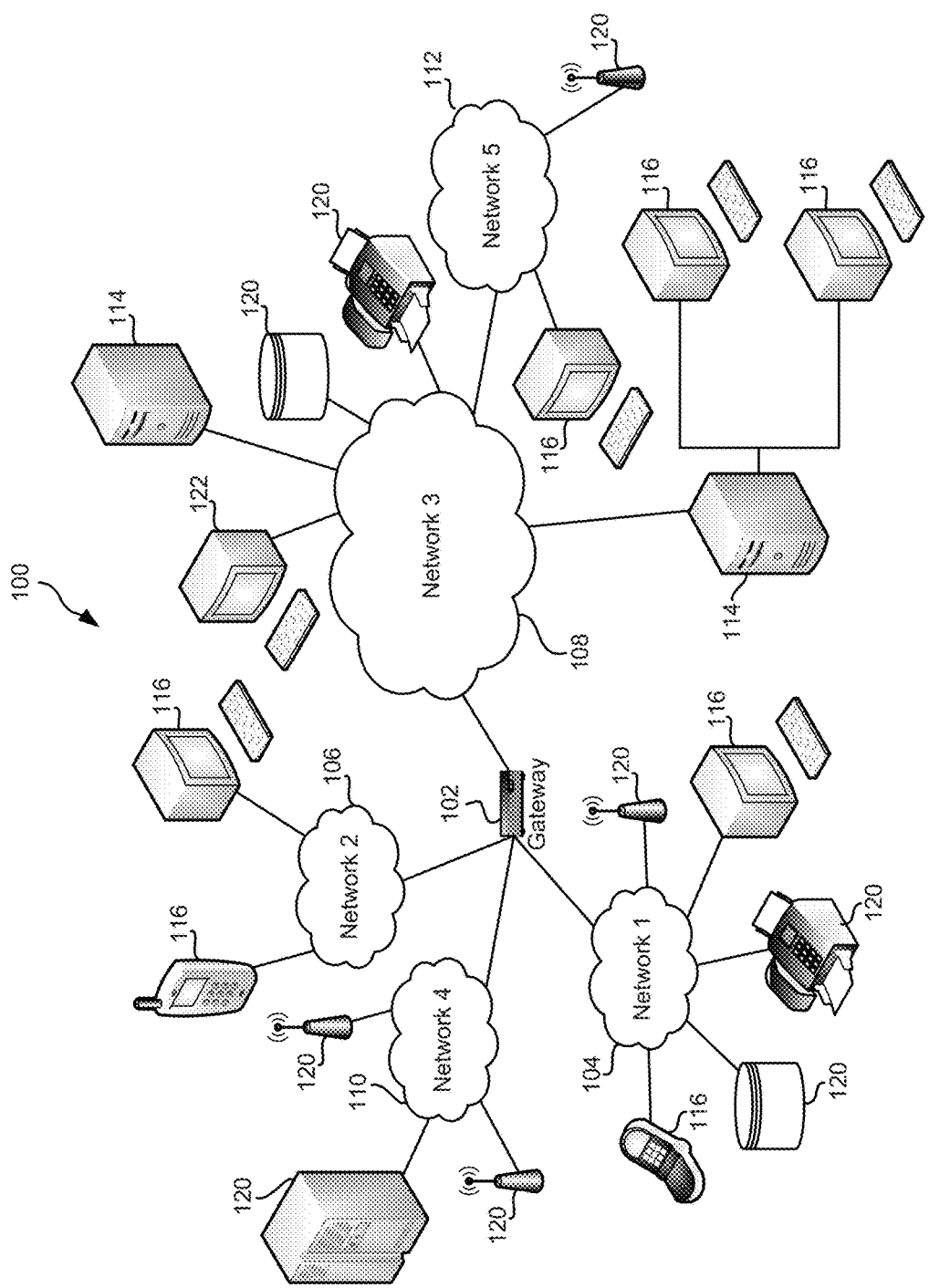
FIG. 1 shows a network architecture, according to one embodiment.

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about to milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurality of connections.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 and a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network 110 may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 100 is at least one data server 114 coupled to the proximate network 108, and which is accessible from the remote networks 104, 106 via the gateway 102. It should be noted that the data server(s) 114 may include any type of computing device/groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system, device, and/or any device useable in a network.

According to some approaches, methods and systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
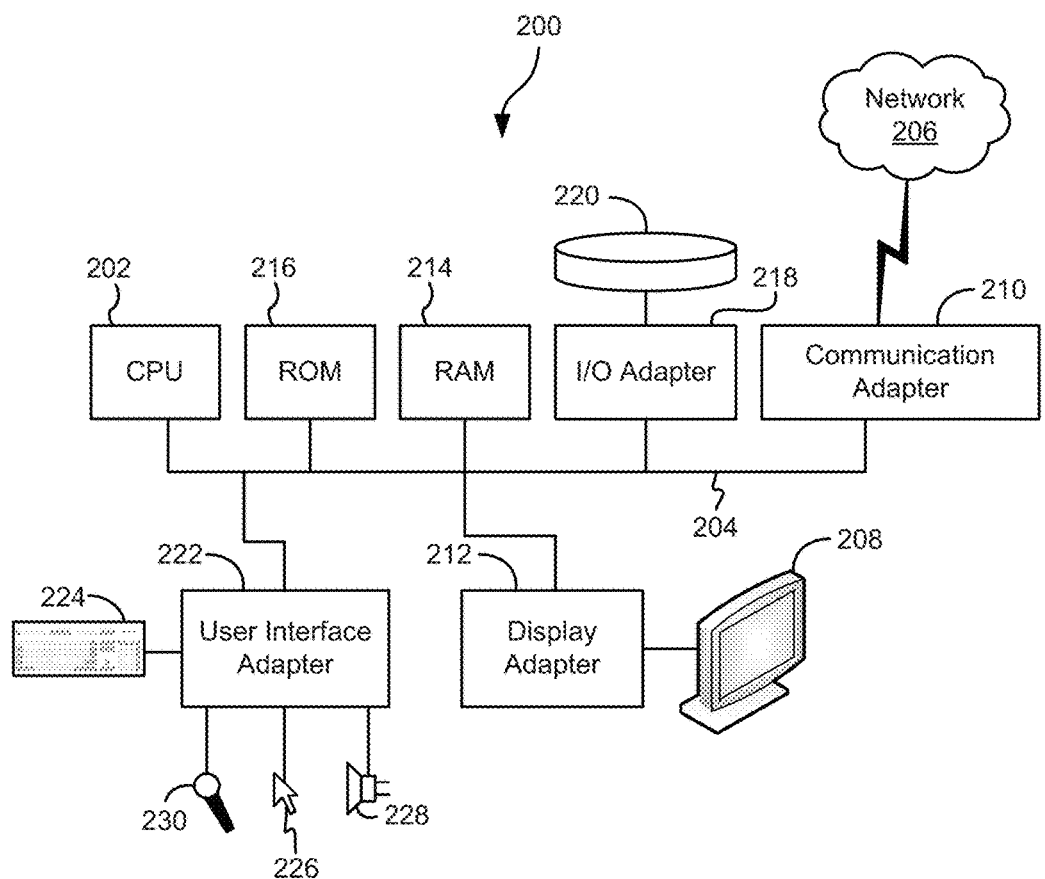
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (ROM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (not shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3A:
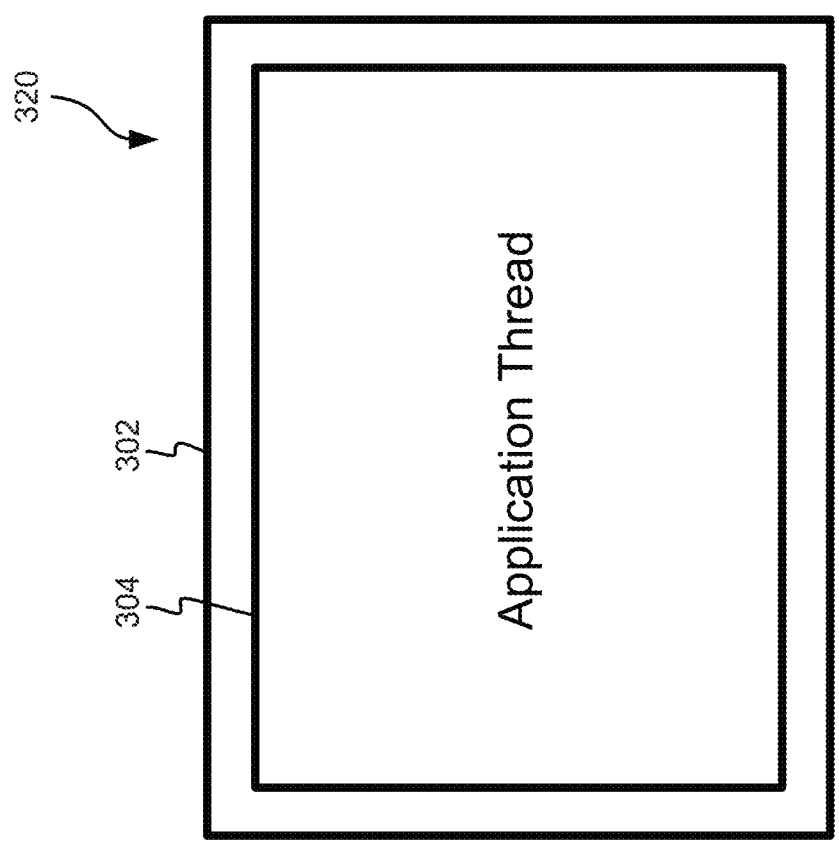
FIG. 3A shows application thread protection, in one embodiment.

FIG. 3A shows application thread protection layers, including an application protection layer (APL) 302 and a data protection layer (DPL) 304 that are used to protect each individual thread 320 from unwanted access and manipulation. To provide this protection according to one embodiment, a thread library and socket library may be created and managed that are wrappers or extensions to standard thread functions and socket functions of the operating system. Moreover, a plurality of policies may be enacted that control access of data socket descriptors from registered application threads and inter-thread communications in a further embodiment.

Figure 3B:
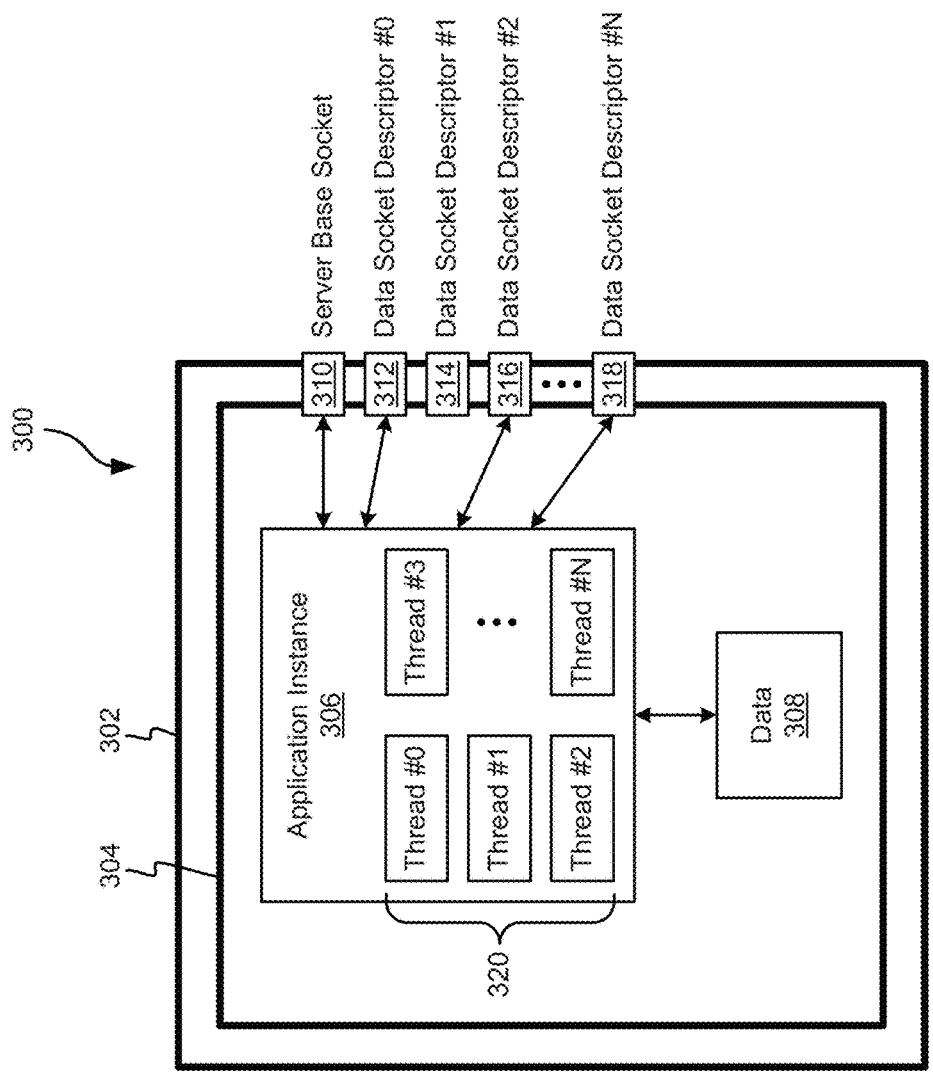
FIG. 3B shows a logical representation of an application instance operating on a computing system, in accordance with one embodiment.

Now referring to FIG. 3B, a logical representation of an application instance 306 operating on a computing system 300 is shown according to one embodiment. Although only one application instance 306 and one set of data 308 is shown in FIG. 3B, as would be understood by one of skill in the art, any number of application instances and groups of data may be hosted on a computing system 300, limited only by the processing power and/or other resources available to the computing system 300.

As shown in FIG. 3B, an APL 302 and a DPL 304 are represented within the computing system 300, according to one embodiment. The application instance 306 has access to data 308 within the computing system 300. Also, the application instance 306, through any number of standard and/or custom application programming interfaces (APIs), may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or computing system 300. One or more server base sockets 310 is provided in the application instance 306 of computing system 300 and is used for control of the peer application instances on the computing system 300, outside the system, or outside the application instance 306 itself, as would be understood by one of skill in the art.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels etc.

Using the above two operations, two layers of protection (application protection and data protection) are enacted together to protect the application (not shown) from which the application instance 306 is provided and any group of application instances related to the application that provides the application instance 306.

The APL 302 works with data socket APIs and data socket libraries to provide protection to application instances and to the data that is used by the application instances. While doing so, the APL 302 does not interfere with the application architecture and its normal behavior. Though these new APIs, each application instance receives extra capabilities to ensure that all flows entering and exiting the application instance are trusted flows. Moreover, the APL 302 receives additional infrastructural help by being informed about the security status of virtual and/or physical servers on which the application instance is running, along with the security status of other application instances and their virtual and/or physical servers. Based on the comprehensive status of the servers and network in the data center, the APIs provide feedback and suggest use of data protection mechanisms to protect data in memory and cache.

FIG. 3B shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the APL 302 and the DPL 304 utilize individual sets of APIs that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system.

ADPL library functions may be used by the application instance 306 to send and receive data using operating system data sockets 312, 314, 316, . . . , 318. ADPL library functions may add all security mechanisms around the socket APIs. Modules in the ADPL architecture include: a security policies database which includes secure application policies specific to E-W policies and N-S policies, and secure data policies. Additional modules include a socket descriptor database, packet processing functions, a management process, and a configuration and logging mechanism.

The ADPL uses micro-security policies with which to secure the application instance 306 and the data 308. Every ingress packet on a selected data socket descriptor (e.g., data socket descriptor #2 316) is verified against the micro-security policies. Security policies are defined as operands, actions/operations, and sub-actions.

Deterministic protection to the application instance 306 may be accomplished, in one embodiment, by securely registering and protecting every individual application thread 320 (e.g., Thread #0, Thread #1, Thread #2, Thread #3, . . . , Thread #N) spawned by the application instance 306. A newly inserted applet or code (such as from malicious software) is able to be detected and identified as soon as it gets spawned in a system where all application threads 320 are registered and protected. An associated quarantine mechanism may also be used to isolate unregistered threads, such that such threads may be restricted from operating and any resources requested by the quarantined thread(s) may be saved from being manipulated and/or accessed by such threads in a further embodiment. Moreover, such threads may also be restricted from using socket devices for communication by applying policies at the data socket descriptors (e.g., data socket descriptor #0 312, data socket descriptor #1 314, data socket descriptor #2 316, . . . , data socket descriptor #N 318) which are configured to identify application threads 320 and access levels for each individual application thread for the various communication mechanisms available in the host system.

Each application thread 320, when spawned by the application process, acquires unique attributes from various sources provided by the ADPL. These attributes include, but are not limited to, a first ID (which may be a globally unique identifier used to distinguish one customer or user from another), a second ID (which may be a unique identifier within the first ID used to indicate a department or group within the customer), an application ID (which may be a globally unique identifier used to distinguish one application from another), an application name (which may be used to refer to the particular application), a server socket port number, a transport protocol, a thread ID (which may be used to distinguish one application thread from another), a process ID (which may be used to distinguish one application process which spawned the thread from another application process), a unique secure source sequence number, a level of access to memory and/or cache resident data, etc. These attributes, alone but particularly in combination, helps each application thread to access socket descriptors according to a socket descriptor's attributes and policies.

There are two types of application security policies applied by the APL 302: E-W Policies and N-S Policies. E-W Policies dictate and limit data socket use in communications with other data sockets and/or servers within the data center. N-S Policies dictate behavior of data sockets that communicate between servers within the data center and hosts and/or servers outside the data center. The communication between individual threads 320 of the same or different applications or application instances may be guided and/or restricted by such N-S policies on data sockets. The individual thread would be able to establish communication to only pre-arranged peer threads via a predefined set of data socket descriptors. In this way, application threads are prohibiting from seeing or being visible to undesired application threads or Advance Persistent Threat (APT) threads that may be operating in the network.

Data security policies refer to complex data-type centric policies. These policies are triggered by the security profile of the data socket based on the data socket descriptor on which data is exchanged. Based on the security profile, the data exchange is allowed, restricted, or limited. The security profile is derived from the packet options which are available via data socket options, in one embodiment.

In another embodiment, the security profile may also be derived from the individual thread or set of threads and their security profiles, which includes application thread access permissions to various data regions in the memory, such as cache resident data, etc.

The application threads 320 of the application instance 306 (of which there may be many different such instances operating within any one host system) are protected by the ADPL around it, e.g., the APL 302 and the DPL 304. The ADPL protects the application threads 320 from being contacted, attacked, and/or spoofed by unwanted applications, unauthorized operations, malicious code, malware applets, etc. The DPL 304 specifically provides infrastructure to protect the data 308 held in memory and cache.

Figure 3C:
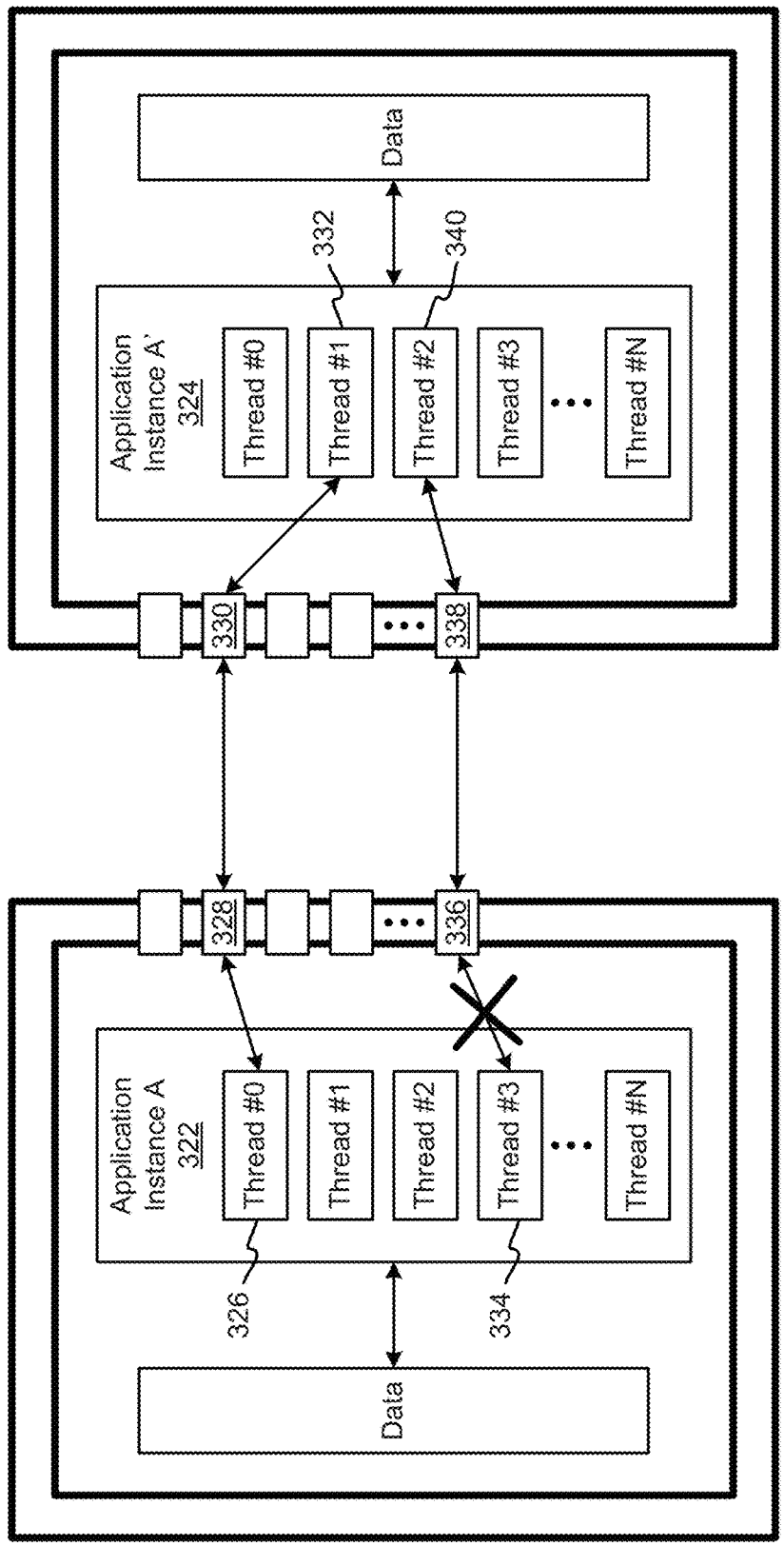
FIG. 3C shows a logical representation of two protected application instances communicating across data sockets, in accordance with one embodiment.

FIG. 3C shows a logical representation of two protected application instances communicating across data sockets, in accordance with one embodiment. Thread #0 326 of Application instance A 322 is in communication with Thread #1 332 of Application instance A' 324. This communication takes place over data socket descriptor 328 for Application instance A 322 and data socket descriptor 330 for Application instance A' 324. This communication is allowed because both threads are registered to communicate with each other over their respective data sockets.

However, Thread #3 334 on Application instance A 322 is restricted from communicating with Thread #2 340 on Application instance A' 324. In the example shown, this is because Thread #3 334 is not registered to access data socket descriptor 336, and therefore the communication is not allowed. This is the case even though Thread #2 340 is authorized to access data socket descriptor 338.

Figure 4:
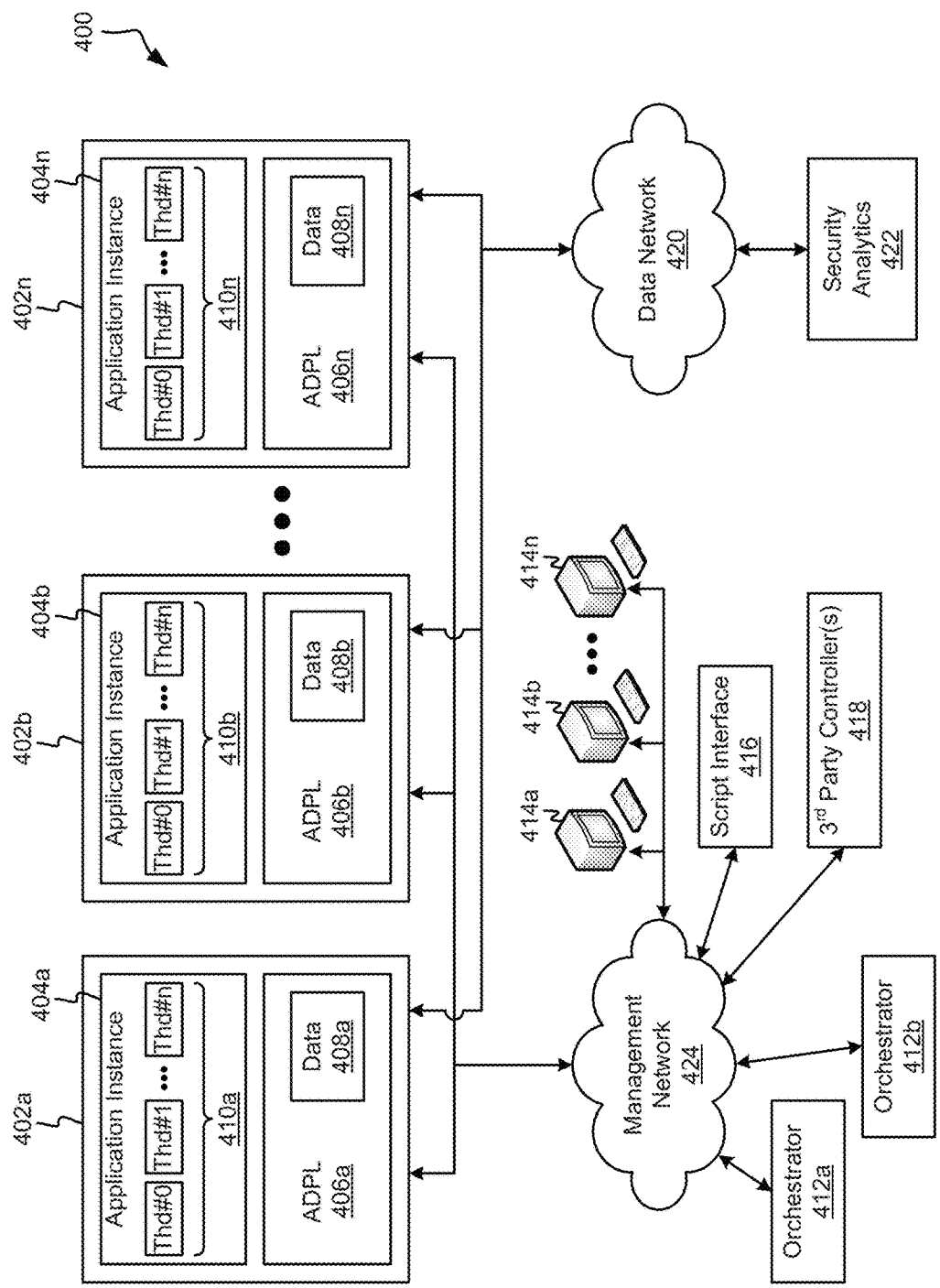
FIG. 4 shows an application and data protection library (ADPL) control model implemented in a data center, according to one embodiment

FIG. 4 shows the ADPL control model implemented in a data center 400, according to one embodiment. As shown, one or more policy orchestrators 412a, 412b is associated with the management network 424. More than one policy orchestrator may be utilized in high availability (HA) mode. Each policy orchestrator 412a, 412b may include segment management, policies management, configuration management, application tracking, a security trending controller, and software defined control.

From the management network 424, APIs, such as representational state transfer (REST) APIs (among others known in the art), may be distributed to the plurality of management consoles 414a, 414b, . . . , 414n, the scripted interface 416, and/or to one or more third party controllers 418. Each of the plurality of management consoles 414a, 414b, . . . , 414n may include a graphical interface, REST API-based programmability, trending, analysis, auditing, and third party controller integration.

One or more virtual platforms 402a, 402b, . . . , 402n host one or more ADPL-shielded application instances 404a, 404b, . . . , 404n along with data 408a, 408b, . . . , 408n utilized by each application instance 404a, 404b, . . . , 404n which are protected by ADPLs 406a, 406b, . . . , 406n. Moreover, each application instance 404a, 404b, . . . , 404n operates a plurality of application threads 410a, 410b, . . . , 410n (e.g., Thd#0, Thd#1, . . . Thd#n). The application threads 410a, 410b, . . . , 410n communicate over various data socket descriptors and data sent and/or received by each application thread over a particular data socket descriptor is accompanied by a unique key, according to one embodiment.

The primary policy orchestrator 412a communicates to the one or more ADPL-shielded application instances 404a, 404b, . . . , 404n through the management network 424. Each of the ADPLs 406a, 406b, . . . , 406n operating for each individual application instance 404a, 404b, . . . , 404n may include application protection and policy enforcement, data protection and policy enforcement, registration of application threads 410a, 410b, . . . , 410n, protection of application threads 410a, 410b, . . . , 410n, and collection of statistics of normal and malicious behavior.

The data network 420 is associated with a security analytics module 422 which may include a security analytics engine and a collection of security analysis tools. In more approaches, the security analytics module 422 may include FireEye Sandbox, and/or other third party security analysis tools, from third parties such as IBM, CISCO, SYMANTEC, MCAFEE, etc. Moreover, the security analytics module 422 may provide feedback to the one or more policy orchestrators 412a, 412b.

One or more of the application instances 404a, 404b, . . . , 404n may be grouped together in pico-segments or groups that each include related socket descriptors and data socket descriptors of application instances along with the set of application threads spawned by those applications, that share characteristics based on data socket descriptors, application thread attributes, etc., among other characteristics. The policy orchestrator 412a, 412b interacts with the various pico-segments of application instances in which ADPL-shielded application instances 404a, 404b, . . . , 404n are grouped together as a whole, rather than with each individual application instance individually.

In one embodiment, socket APIs and/or libraries and thread APIs and/or libraries are used to provide protection to applications and application data, specifically by protecting individual application threads operating within an application instance through registration and monitoring. While providing such protection, the mechanism does not interfere with the application architecture and normal behavior of the application and instances thereof.

Figure 5:
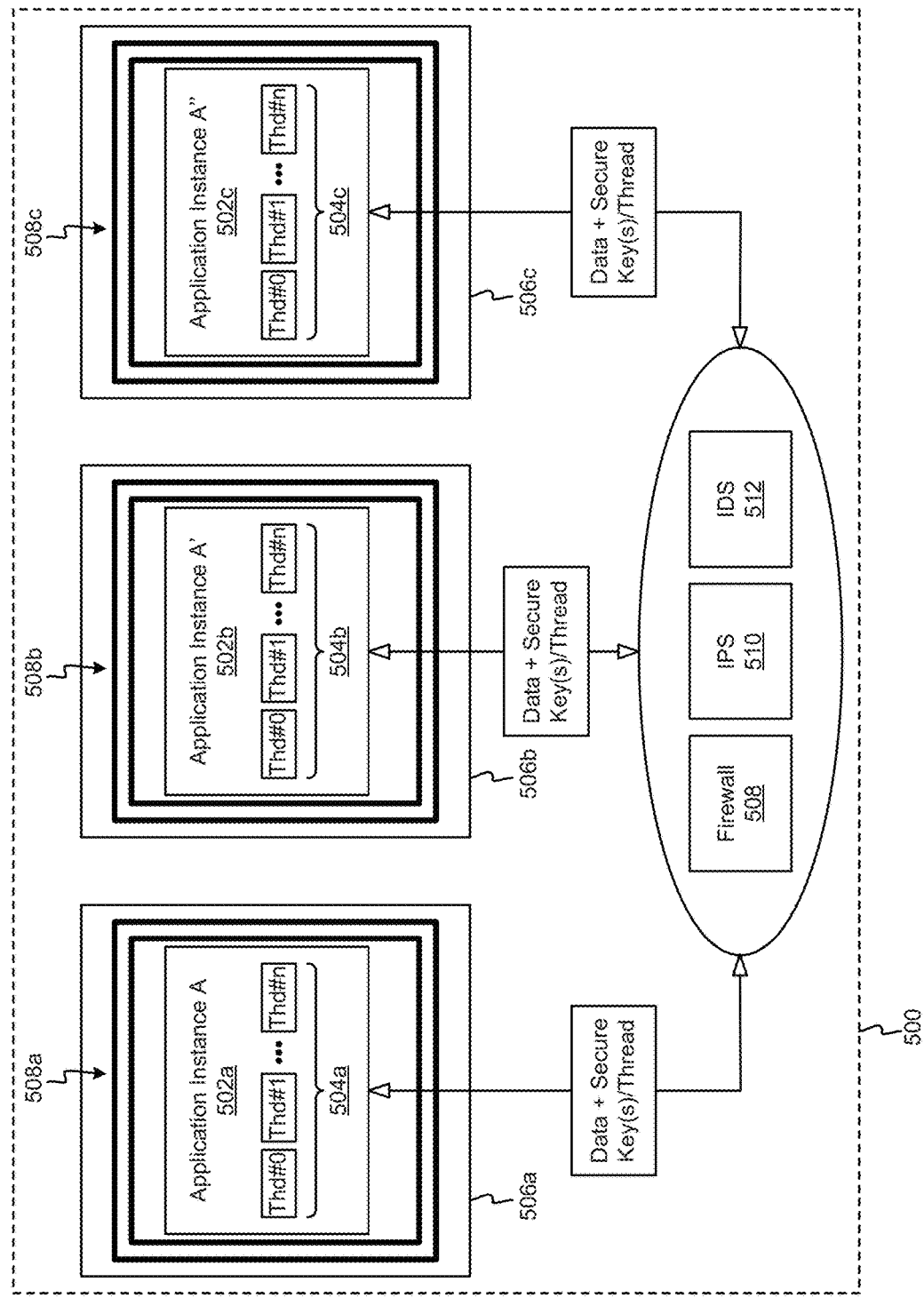
FIG. 5 shows several application instances operating in a virtual environment, according to one embodiment.

Now referring to FIG. 5, three instances of an application, Application instance A 502a, Application instance A' 502b, and Application instance A" 502c are shown running in a virtual environment 500 on one or more virtual platforms, such as hypervisors. Many more than three instances of an application may be running in the virtual environment 500 at any one time as would be understood by one of skill in the art, on the order of thousands or millions in some cases. Each application instance operates a plurality of application threads 504a, 504b, and 504c, for Application instance A 502a, Application instance A' 502b, and Application instance A" 502c, respectively. These application threads 504a, 504b, 504c execute functionality for an application instance thereof, and are capable of communicating to other network resources and application instances, as programmed and authorized.

ADPLs 508a, 508b, 508c are provided for each Application instance 502a, 502b, 502C by secure APIs called by the hosts, Host A 506a, Host A' 506b, and Host A" 506c, and enable application protection via pico-segmentation, policies, and also provide data protection by sharing a security profile and a secure key for each application thread that sends a message to any peer application instances operating on other hosts (Application instance A 502a is a peer to Application instance A' 502b, Application instance A' 502b is a peer to Application instance A" 502c, Application instance A" 502c is a peer to Application instance A 502a, and so forth). Using the secure key for each application thread, the protected application instance is provided the capability to apply various data security mechanisms to protect itself from malicious code and data breach attacks.

Each instance of the application (e.g., Application instance A 502a, Application instance A' 502b, Application instance A" 502c, etc.) may run on the same physical machine or on different physical or virtual machines in the data center. However, all the application instances communicate with each other to share data and other information to satisfy queries.

New socket APIs and data protection APIs that are utilized to provide the protection do not disturb any intermediate security appliances used in the network and/or on the servers or hosts, such as a firewall 508, an Intrusion Prevention System (IPS) 510, an Intrusion Detection System (IDS) 512, etc.

Each of the ADPLs 508a, 508b, 508c around the socket descriptors for each database application instance create a mapping of security profile policies with the application per data socket descriptor to perform various security feature functionality, such as dynamic cache flush, dynamic data redaction, locking of in-memory database(s), etc. These security features are configured to be applied on a per application instance per session basis. As a result, a database server is allowed to enact a dynamic security feature depending upon the security profile of that particular session at that time, thereby avoiding cache scraping, data breaches, or other unwanted intrusion by malware or nefarious applications.

Each of the ADPLs 508a, 508b, 508c are also configured to access a thread library which may be configured and/or implemented as a wrapper around one or more standard operating system thread functions in one embodiment. Therefore, this thread library may utilize standard operating system functionality, and build upon it, to provide a storage architecture for registering application threads and accessing information regarding registered application threads. This is similar to the data socket library which may be implemented as a wrapper around standard data socket operating system socket functions. Moreover, each of the ADPLs 508a, 508b, 508c may also include policies to control access to memory, cache resident data, and data socket descriptors from registered application threads and inter-thread communications in another embodiment.

With the availability of mapping between the security profiles of each data socket descriptor and security policy, a new dynamic is created for use by the ADPLs 508a, 508b, 508c. With this mechanism, the security profile for an individual session may be provided to an associated application by the underlying protection layer by the use of various standard and/or specialized socket APIs like getsockopt( ), adpl_getsockopt( ), etc. Based on application requirements, these APIs may be called by the ADPLs 508a, 508b, 508c to understand the security profile of the session and any suggested actions included in the security policy. Similarly, a security profile of an application thread may be accessed via an extension of standard thread APIs in one embodiment.

Figure 6:
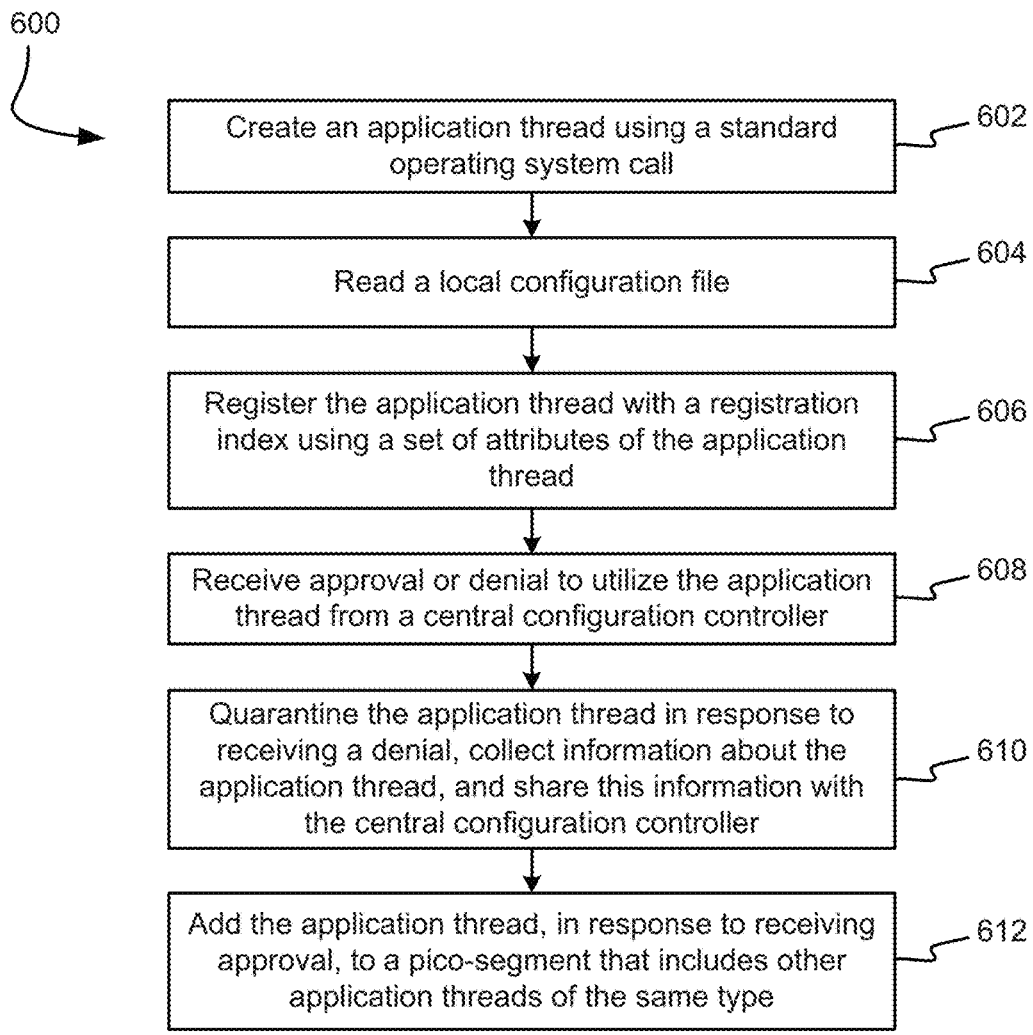
FIG. 6 shows a flowchart of a method, according to one embodiment.

Now referring to FIG. 6, a flowchart of a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be apparent to one of skill in the art upon reading the present descriptions.

Each of the steps of the method 600 may be performed by any suitable component of the operating environment. For example, in various embodiments, the method 600 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 600. Illustrative processing units include, but are not limited to, a central processing unit (CPU), an ASIC, a FPGA, etc., combinations thereof, or any other suitable computing device known in the art.

As shown in FIG. 6, method 600 may initiate with operation 602, where an application thread is created using a standard operating system call, as would be understood by one of skill in the art. Any type of application thread may be called.

In operation 604, a local configuration file is read. The local configuration file provides a set of attributes. The attributes may include a first identifier (ID), a second ID, an application name and/or ID, a server port number, a data socket port number, a transport protocol, etc.

In operation 606, the application thread is registered with a registration index using a set of attributes of the application thread. The attributes may be selected from a group comprising an application thread ID, a process ID, a uniquely generated, spoof-proof sequence number which may be recognized and understood by other application threads of the same type and parameters read from other local configuration files.

In operation 608, approval or denial to utilize the application thread is received from a central configuration controller (or some other central or distributed control platform).

In operation 610, in response to receiving a denial, the application thread is quarantined, information about the application thread is collected, and this information is shared with the central configuration controller. In a further embodiment, this information may be shared with other entities, such as other hosts in a network, servers, end point protection agents, etc.

In operation 612, in response to receiving approval, the application thread is added to a pico-segment that includes other application threads of the same type. This pico-segment virtually groups application threads together which have the same attributes (as registered in the registration index) and access the same data socket descriptors.

Method 600 may be implemented as a system, process, or a computer program product. For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 600, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 600 in one embodiment.

Figure 7:
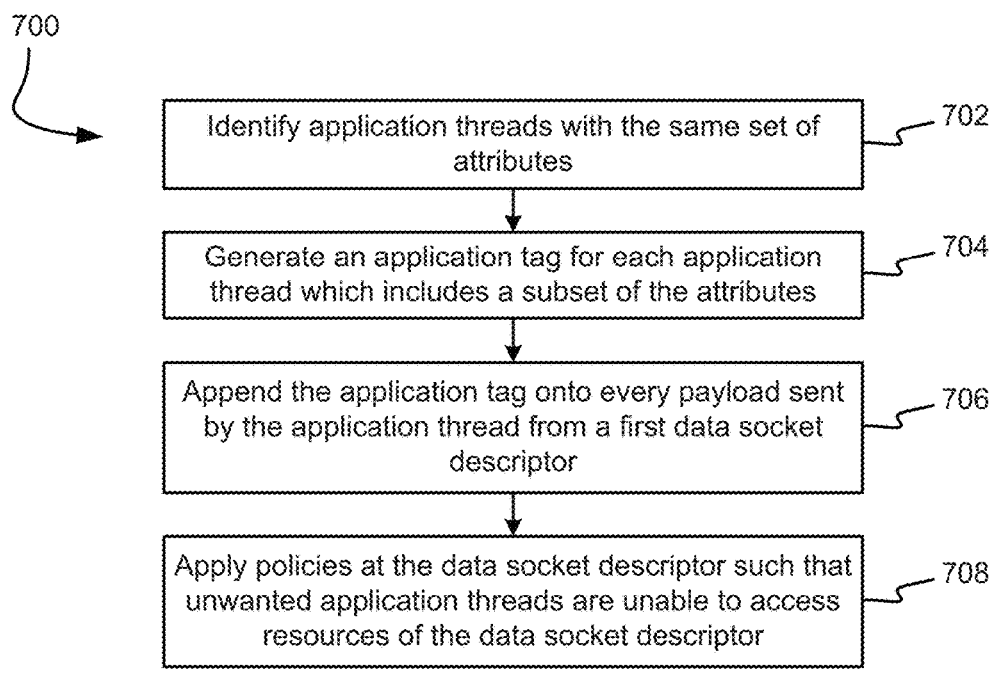
FIG. 7 shows a flowchart of a method, according to one embodiment.

With reference to FIG. 7, a flowchart of a method 700 is shown according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be apparent to one of skill in the art upon reading the present descriptions.

Each of the steps of the method 700 may be performed by any suitable component of the operating environment. For example, in various embodiments, the method 700 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 700. Illustrative processing units include, but are not limited to, a central processing unit (CPU), an ASIC, a FPGA, etc., combinations thereof, or any other suitable computing device known in the art.

As shown in FIG. 7, method 700 may initiate with operation 702, where application threads with the same set of attributes are identified, such as at a time of registration of one or more of the application threads. These similar application threads that have the same set of attributes are grouped together into a single group, called a pico-segment. The attributes may include, but are not limited to: which includes but not limited to a first ID, a second ID, an application name and/or ID, a server port number, a data socket port number, a transport protocol, an application thread ID, a process ID, a unique secure source ID (which may be a sequence number or some other identifier), etc.

In operation 704, an application tag is generated for each application thread which includes a subset of the attributes. This subset of attributes may include the first ID, the second ID, the application name and/or ID, the application thread ID, the process ID, and the unique secure source ID.

In operation 706, the application tag is appended onto every payload sent by the application thread from a first data socket descriptor. The first data socket descriptor is associated with the application tag and the application thread, as this application thread is authorized to use this data socket descriptor.

All of the application threads which have the same attributes (and are accordingly grouped together in the same pico-segment) are allowed to communicate with each other without additional encryption, snooping, or other security safeguards. The receiver device, upon receiving the message, checks the application tag and attributes associated with and/or included in the application tag, and accordingly accepts or rejects the payload based on the application tag (or lack thereof). If a message is received without an application tag or with an application tag that is nonsensical or incorrect, this message is considered to be improper, and may be deleted, dropped, quarantined, etc.

In operation 708, policies are applied at the data socket descriptor such that unwanted application threads are unable to access resources of the data socket descriptor. Moreover, the application thread library or libraries may perform checks such that unwanted or unregistered application threads are identified and reported to the central management controller(s). Once these unwanted or unregistered application threads are identified to the central management controller(s), various actions may be taken, such as outlawing the use of the application threads in any or all hosts in the network, removing applications which spawn such threads in any or all hosts in the network, etc.

Method 700 may be implemented as a system, process, or a computer program product. For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 700, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 700 in one embodiment.

Figure 8:
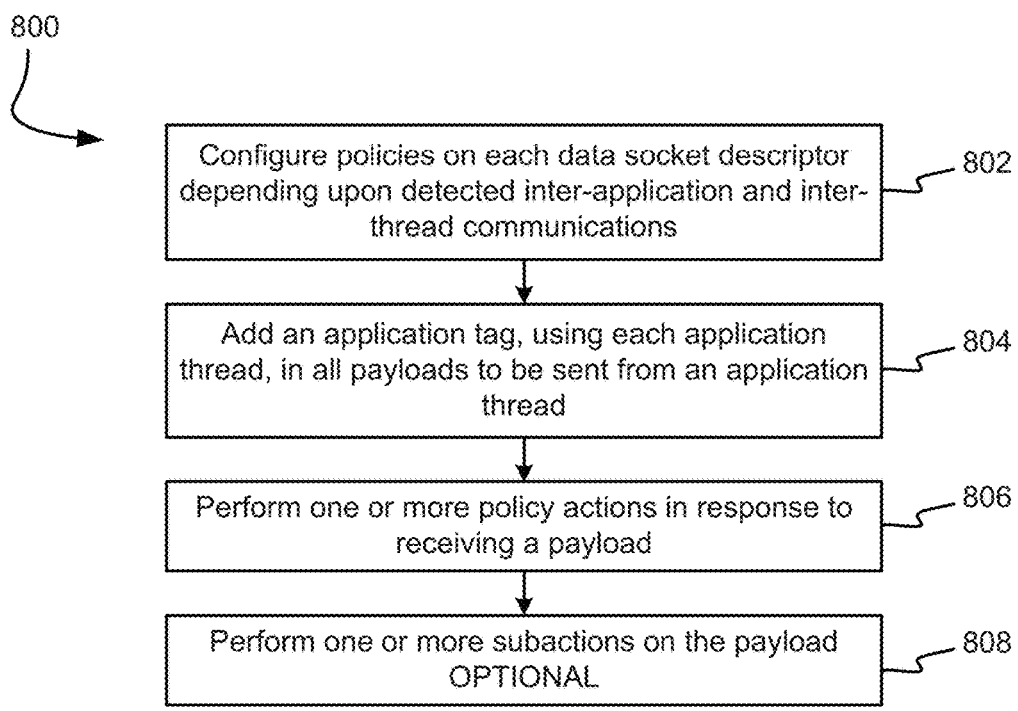
FIG. 8 shows a flowchart of a method, according to one embodiment.

With reference to FIG. 8, a flowchart of a method 800 is shown according to one embodiment. The method 800 may be performed in accordance with the present invention in any of the environments depicted in FIGS. 1-5, among others, in various embodiments. Of course, more or less operations than those specifically described in FIG. 8 may be included in method 800, as would be apparent to one of skill in the art upon reading the present descriptions.

Each of the steps of the method 800 may be performed by any suitable component of the operating environment. For example, in various embodiments, the method 800 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 800. Illustrative processing units include, but are not limited to, a central processing unit (CPU), an ASIC, a FPGA, etc., combinations thereof, or any other suitable computing device known in the art.

As shown in FIG. 8, method 800 may initiate with operation 802, where policies on each data socket descriptor are configured, such as by an application security engineer (ASE), network administrator, etc., depending upon detected inter-application and inter-thread communications. This way, any unwanted application thread may neither use local data socket descriptors or remote data socket descriptors on other hosts in the network. Hence, stopping application thread-to-thread communication of unwanted application threads.

In operation 804, every application thread adds an application tag in all payloads to be sent therefrom. This application tag is used to identify pico-segment membership mapping, understand access levels, and match the policies at an egress of a data socket used to send the payload and at the ingress of a peer data socket which receives the payload. Some or all of the attributes previously described may be matched as per the policy definition. The policy format is flexible and not limited to fields described herein only.

In operation 806, one or more policy actions are performed in response to receiving a payload, such as drop, drop analyze, allow, allow analyze, etc. On finding a matching policy, a policy action is applied to the payload.

In operation 808, one or more subactions may be performed on the payload. Subactions are secondary actions taken as per the policy, and may include mirror, log, trap, encrypt, partially encrypt, etc.

Method 800 may be implemented as a system, process, or a computer program product. For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 800, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 800 in one embodiment.

Figure 9:
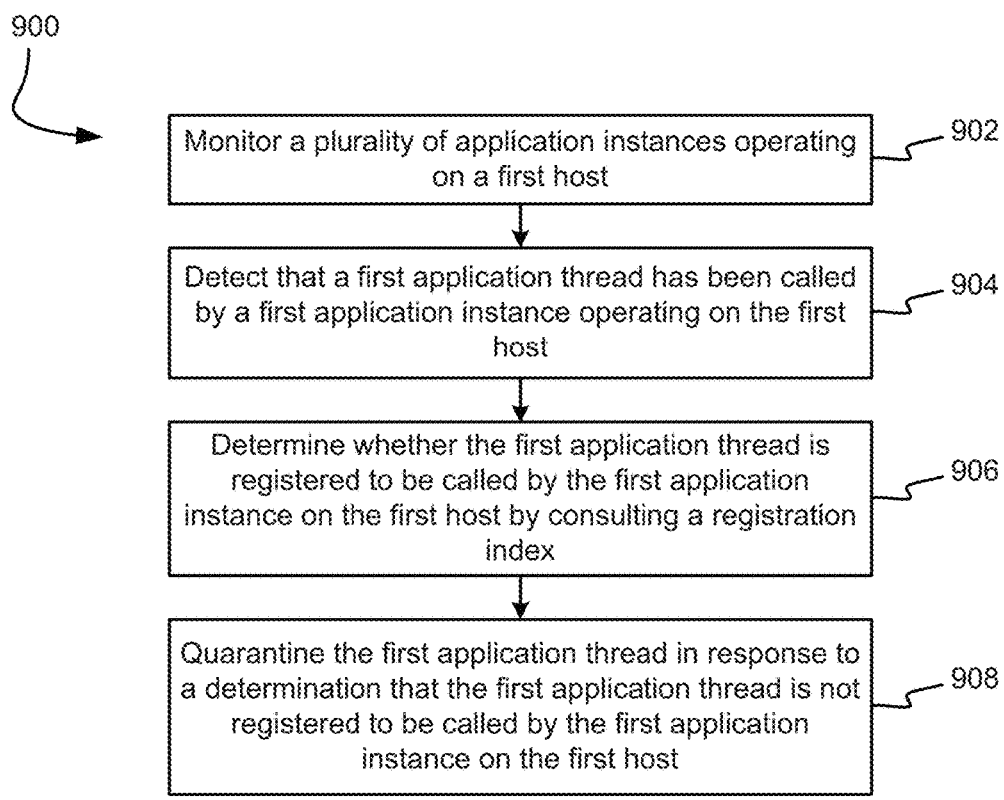
FIG. 9 shows a flowchart of a method, according to one embodiment.

Now referring to FIG. 9, a flowchart of a method 900 is shown according to one embodiment. The method 900 may be performed in accordance with the present invention in any of the environments depicted in FIGS. 1-5, among others, in various embodiments. Of course, more or less operations than those specifically described in FIG. 9 may be included in method 900, as would be apparent to one of skill in the art upon reading the present descriptions.

Each of the steps of the method 900 may be performed by any suitable component of the operating environment. For example, in various embodiments, the method 900 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 900. Illustrative processing units include, but are not limited to, a central processing unit (CPU), an ASIC, a FPGA, etc., combinations thereof, or any other suitable computing device known in the art.

As shown in FIG. 9, method 900 may initiate with operation 902, where a plurality of application instances operating on a first host are monitored. The application instances are monitored to determine, among other actions, whether they spawn application threads that attempt to access resources in the network and/or send messages to applications operating on other hosts in the network.

In operation 904, calling of a first application thread by a first application instance operating on the first host is detected. Any method for detecting this application thread may be used as would be understood by one of skill in the art.

In operation 906, it is determined whether the first application thread is registered to be called by the first application instance on the first host by consulting a registration index. The registration index may be maintained locally, and/or on a central management controller that stores information for all applications and application threads authorized to operate and inter-operate in the network.

In operation 908, the first application thread is quarantined in response to a determination that the first application thread is not registered to be called by the first application instance on the first host. Quarantining an application thread may include, but is not limited to isolating the thread, deleting the thread, restricting communication of the thread with any other entity within or external to the network, etc.

In a further embodiment, method 900 may include detecting that a second application thread has been called by the first application instance operating on the first host. The calling of the application thread may be accomplished by modifying an API which is used to call application threads conventionally, so that any use of the API triggers an alert that an application thread is being called prior to allowing the thread to spawn.

Moreover, in this embodiment, the second application thread is registered in the registration index in response to a determination that the second application thread is authorized. This registration process may include, but is not limited to, storing information about the application thread in the registration index. This registration information may be centralized or distributed to each application. Moreover, the matching of the payloads generated by the application threads on corresponding data socket descriptors may be accomplished using registration on the ingress operation and/or the egress operation at each data socket descriptor.

In another embodiment, method 900 may include detecting that a third application thread has been called by the first application instance operating on the first host. Thereafter, in response to this detection, it is determined whether the third application thread is registered to be called by the first application instance on the first host by consulting the registration index. This determination may be made by comparing information about the third application thread to entries stored to the registration index. Moreover, the third application thread is allowed to operate on the first host in response to a determination that the third application thread is registered in the registration index.

According to yet another embodiment, method 900 may include storing one or more attributes of the second application thread in the registration index. Any suitable attributes may be used, such as a first ID that is a globally unique identification number given for an entity, a second ID that is a unique identification number within an entity which is provided the first ID, an application name and/or ID that identifies the application or application instance from other applications that may operate in the network, a server socket port number associated with the application thread, a transport protocol used to transmit messages by the application thread, an application thread ID or some other identifying number or alphanumeric string that uniquely identifies the application thread from all other application threads that may be spawn by the associated application, a process ID or some other identifying number or alphanumeric string that uniquely identifies the process from all other processes that may be spawn by the associated application, a unique secure source sequence ID that utilizes a combination of more than one attribute to uniquely identify the application thread, and the payloads generated by that thread, a security profile for the second application thread, access levels for the second application thread to memory and cache resident data, etc.

Method 900 may further include determining whether one or more application threads operating on other hosts in a network shared by the first host share the one or more attributes of the second application thread, and grouping all application threads together into a first group that share the one or more attributes of the second application thread. Moreover, method 900 may include allowing all application threads in the first group to operate on a respective host in the network and interoperate with each other across the network, due to their inclusion in the registered first group, which may be referred to as a pico-segment.

In another further embodiment, method 900 may include generating a unique key for the second application thread and sending the unique key with each message sent by the second application thread. In this way, in yet another further embodiment, method 900 may include receiving a first message using the second application thread, determining whether the first message identifies the unique key for the second application thread, and classifying the first message as being generated by an unauthorized application thread in response to a determination that the first message does not identify the unique key for the second application thread.

According to yet another embodiment, method 900 may include allowing a plurality of second application threads to operate on one or more hosts in a network in response to a determination that the second application thread is registered in the registration index. Moreover, an application security policy and/or a data security policy may be applied to each of the plurality of second application threads via ADPLs operating on the one or more hosts.

Method 900 may be implemented as a system, process, or a computer program product. For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 900, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 900 in one embodiment.

Variations of the systems, methods, and computer program products described herein are also possible, and the explicit description thereof in this document is not required in order to provide those of skill in the art with the ability to conceive of such variations when reading the present descriptions.

What is claimed is:
1. A system, comprising:
a processing circuit and logic integrated with and/or executable by the processing circuit, the logic causing the processing circuit to:
monitor a plurality of application instances operating on a first host;
detect that a first application thread has been called by a first application instance operating on the first host;
determine whether the first application thread is registered to be called by the first application instance on the first host by consulting a registration index;
quarantine the first application thread in response to a determination that the first application thread is not registered to be called by the first application instance on the first host;

detect that a second application thread has been called by the first application instance operating on the first host;
determine whether the second application thread is associated with a first data socket descriptor, wherein the first data socket descriptor is associated with the first application instance;
determine the second application thread is authorized in response to determining the second application thread is associated with the first data socket descriptor; and
register the second application thread in the registration index in response to a determination that the second application thread is authorized.

2. The system as recited in claim 1, wherein the logic further causes the processing circuit to:
detect that a third application thread has been called by the first application instance operating on the first host;
determine whether the third application thread is registered to be called by the first application instance on the first host by consulting the registration index; and
allow the third application thread to operate on the first host in response to a determination that the third application thread is registered in the registration index.

3. The system as recited in claim 1, wherein the logic further causes the processing circuit to:
store one or more attributes of the second application thread in the registration index;
determine whether one or more application threads operating on other hosts in a network shared by the first host share the one or more attributes of the second application thread;
group all application threads together into a first group that share the one or more attributes of the second application thread; and
allow all application threads in the first group to operate on a respective host in the network and interoperate with each other across the network.

4. The system as recited in claim 3, wherein the one or more attributes include at least one attribute selected from a group comprising:
a first identifier (ID) that is a globally unique identification number given for an entity;
a second ID that is a unique identification number within an entity which is provided the first ID;
a server socket port number;
a transport protocol;
an application thread ID;
a process ID;
a unique secure source sequence ID;
a security profile for the second application thread; and
access levels for the second application thread to memory and cache resident data.

5. The system as recited in claim 1, wherein the logic further causes the processing circuit to:
generate a unique key for the second application thread; and
send the unique key with each message sent by the second application thread.

6. The system as recited in claim 5, wherein the logic further causes the processing circuit to:
receive a first message using the second application thread;
determine whether the first message identifies the unique key for the second application thread; and
classify the first message as being generated by an unauthorized application thread in response to a determination that the first message does not identify the unique key for the second application thread.

7. The system as recited in claim 1, wherein the logic further causes the processing circuit to:
allow a plurality of second application threads to operate on one or more hosts in a network in response to a determination that the second application thread is registered in the registration index; and
apply an application security policy and/or a data security policy to each of the plurality of second application threads via application and data protection layers operating on the one or more hosts.

8. A method, comprising:
monitoring a plurality of application instances operating on a first host;
detecting that a first application thread has been called by a first application instance operating on the first host;
determining whether the first application thread is registered to be called by the first application instance on the first host by consulting a registration index;
quarantining the first application thread in response to a determination that the first application thread is not registered to be called by the first application instance on the first host;
detecting that a second application thread has been called by the first application instance operating on the first host;
determining whether the second application thread is associated with a first data socket descriptor, wherein the first data socket descriptor is associated with the first application instance;
determining the second application thread is authorized in response to determining the second application thread is associated with the first data socket descriptor; and
registering the second application thread in the registration index in response to a determination that the second application thread is authorized;
detecting that a third application thread has been called by the first application instance operating on the first host;
determining whether the third application thread is registered to be called by the first application instance on the first host by consulting the registration index; and
allowing the third application thread to operate on the first host in response to a determination that the third application thread is registered in the registration index.

9. The method as recited in claim 8, further comprising:
storing one or more attributes of the second application thread in the registration index;
determining whether one or more application threads operating on other hosts in a network shared by the first host share the one or more attributes of the second application thread;
grouping all application threads together into a first group that share the one or more attributes of the second application thread; and
allowing all application threads in the first group to operate on a respective host in the network and interoperate with each other across the network.

10. The method as recited in claim 9, wherein the one or more attributes include at least one attribute selected from a group comprising:
a first identifier (ID) that is a globally unique identification number given for an entity;
a second ID that is a unique identification number within an entity which is provided the first ID;
a server socket port number;
a transport protocol;

an application thread ID;
a process ID;
a unique secure source sequence ID;
a security profile for the second application thread; and
access levels for the second application thread to memory and cache resident data.

11. The method as recited in claim 8, further comprising:
generating a unique key for the second application thread;
sending the unique key with each message sent by the second application thread;
receiving a first message using the second application thread;
determining whether the first message identifies the unique key for the second application thread; and
classifying the first message as being generated by an unauthorized application thread in response to a determination that the first message does not identify the unique key for the second application thread.

12. The method as recited in claim 8, further comprising:
allowing a plurality of second application threads to operate on one or more hosts in a network in response to a determination that the second application thread is registered in the registration index; and
applying an application security policy and/or a data security policy to each of the plurality of second application threads via application and data protection layers operating on the one or more hosts.

13. A computer program product, comprising a non-transitory computer readable storage medium having program instructions stored thereon, the program instructions being executable by a processing circuit to cause the processing circuit to:
monitor a plurality of application instances operating on a first host;
detect that a first application thread has been called by a first application instance operating on the first host;
determine whether the first application thread is registered to be called by the first application instance on the first host by consulting a registration index;
quarantine the first application thread in response to a determination that the first application thread is not registered to be called by the first application instance on the first host;
detect that a second application thread has been called by the first application instance operating on the first host;
determine whether the second application thread is associated with a first data socket descriptor, wherein the first data socket descriptor is associated with the first application instance;
determine the second application thread is authorized in response to determining the second application thread is associated with the first data socket descriptor;
register the second application thread in the registration index in response to a determination that the second application thread is authorized;
detect that a third application thread has been called by the first application instance operating on the first host;
determine whether the third application thread is registered to be called by the first application instance on the first host by consulting the registration index; and
allow the third application thread to operate on the first host in response to a determination that the third application thread is registered in the registration index.

14. The computer program product as recited in claim 13, wherein the program instructions further cause the processing circuit to:
store one or more attributes of the second application thread in the registration index;
determine whether one or more application threads operating on other hosts in a network shared by the first host share the one or more attributes of the second application thread;
group all application threads together into a first group that share the one or more attributes of the second application thread; and
allow all application threads in the first group to operate on a respective host in the network and interoperate with each other across the network.

15. The computer program product as recited in claim 14, wherein the one or more attributes include at least one attribute selected from a group comprising:
a first identifier (ID) that is a globally unique identification number given for an entity;
a second ID that is a unique identification number within an entity which is provided the first ID;
a server socket port number;
a transport protocol;
an application thread ID;
a process ID;
a unique secure source sequence ID;
a security profile for the second application thread; and
access levels for the second application thread to memory and cache resident data.

16. The computer program product as recited in claim 13, wherein the program instructions further cause the processing circuit to:
generate a unique key for the second application thread;
send the unique key with each message sent by the second application thread;
receive a first message using the second application thread;
determine whether the first message identifies the unique key for the second application thread; and
classify the first message as being generated by an unauthorized application thread in response to a determination that the first message does not identify the unique key for the second application thread.

17. The computer program product as recited in claim 13, wherein the program instructions further cause the processing circuit to:
allow a plurality of second application threads to operate on one or more hosts in a network in response to a determination that the second application thread is registered in the registration index; and
apply an application security policy and/or a data security policy to each of the plurality of second application threads via application and data protection layers operating on the one or more hosts.

* * * * *